United States Patent [19]
Yuhi et al.

[11] Patent Number: 5,633,542
[45] Date of Patent: May 27, 1997

[54] MINIATURE MOTOR

[75] Inventors: Toshiya Yuhi; Takahiro Ohtake; Masahiko Kato; Ryouichi Someya, all of Chiba-ken, Japan

[73] Assignee: Mabuchi Motor Co., Ltd., Matsudo, Japan

[21] Appl. No.: 259,031

[22] Filed: Jun. 10, 1994

[30] Foreign Application Priority Data

Jun. 15, 1993 [JP] Japan .................. 5-143215
Apr. 11, 1994 [JP] Japan .................. 6-071860

[51] Int. Cl.⁶ .................. H02K 11/00; H01R 4/26; H01R 11/20
[52] U.S. Cl. .................. 310/40 MM; 310/71; 310/68 C; 439/441
[58] Field of Search .................. 310/68 C, 71, 310/40 MM, 72, 239; 439/439, 440, 441

[56] References Cited

U.S. PATENT DOCUMENTS

| | | | |
|---|---|---|---|
| 4,105,276 | 8/1978 | Miller | 439/441 |
| 4,673,232 | 6/1987 | Kubota et al. | 439/441 |
| 5,216,305 | 6/1993 | Strobl | 310/71 |
| 5,218,254 | 6/1993 | Someya | 310/71 |
| 5,281,876 | 1/1994 | Sato | 310/40 MM |
| 5,294,852 | 3/1994 | Straker | 310/68 C |
| 5,382,852 | 1/1995 | Yuhi et al. | 310/40 MM |
| 5,434,460 | 7/1995 | Mabuchi et al. | 310/71 |

*Primary Examiner*—Clayton E. LaBalle
*Attorney, Agent, or Firm*—McGlew and Tuttle

[57] ABSTRACT

A miniature motor comprising a case having a positive temperature coefficient resistor incorporated therein and a permanent magnet fixedly fitted thereto, a rotor comprising an armature and a commutator, and a case cap having a pair of power-feeding brushes and a pair of input terminals electrically connected to the brushes, in which a lanced and raised lug or lanced and raised projections are provided at the tip of a retaining member made of an electrically conductive material, a retaining part is formed by bending a part or the whole of the tip of the retaining member toward the side of the lanced and raised lug or lanced and raised projections, the size of a gap between a projection or a lanced and raised lug provided on any one surface of a pair of input terminals, and the retaining part in free state and the lanced and raised lug is made smaller than the thickness of the positive temperature coefficient resistor being inserted therebetween so that the positive temperature coefficient resistor can be inserted into the gap, and the lanced and raised lug or lanced and raised projection can cut into the surface of the electrode of the positive temperature coefficient resistor, resisting the movement of the positive temperature coefficient resistor in the extracting direction.

6 Claims, 12 Drawing Sheets

MINIATURE MOTOR

BACKGROUND OF THE INVENTION AND RELATED ART STATEMENT

This invention relates generally to a miniature motor used in audio equipment, precision instruments, automotive electrical equipment, etc. and more specifically to a miniature motor having a positive temperature coefficient resistor for controlling overcurrent flowing in a motor armature by detecting the temperature of the motor.

Figure 1:
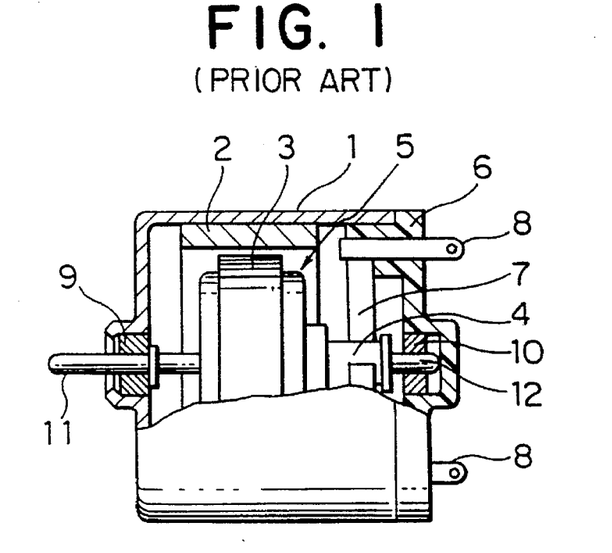
FIG. 1 is a longitudinal sectional front view illustrating the essential part of an example of miniature motor of a conventional type.

FIG. 1 is a longitudinal sectional front view of the essential part of a conventional type of miniature motor. In FIG. 1, numeral 1 denotes a case made of a metallic material, such as mild steel, formed into a bottomed hollow tubular shape and having a permanent magnet 2 formed into an arc-segment shape, for example, and fixedly fitted to the inner circumferential surface thereof. In the case 1 provided is a rotor 5 comprising an armature 3 facing the permanent magnet 2 and a commutator 4.

Numeral 6 denotes a case cap made of an insulating material, such as a resin material, and fitted to an open end of the case 1. Numeral 7 denotes a brush having a sliding contact shoe at the free end thereof for making sliding contact with the commutator 4, and provided in the case cap 6, together with an input terminal 8 electrically connected to the brush 7. Numerals 9 and 10 denote bearings, fixedly fitted to the bottom of the case 1 and the central part of the case cap 6, respectively, for supporting the shafts 11 and 12 constituting the rotor 5.

With the aforementioned construction, when power is fed from the input terminals 8 and 8 to the armature 3 via the brushes 7 and 7, and the commutator 4 constituting the rotor 5, rotating force is imparted to the armature 3 placed in a magnetic field formed by the permanent magnet 2 fixedly fitted to the inner circumferential surface of the case 1, causing external equipment (not shown) to be driven via the output-side shaft 11.

The miniature motor as shown in FIG. 1 has a wide range of applications, as described earlier, and particularly useful as motors for driving automotive electrical equipment, such as electrically operated rear-view mirrors, electric-powered door-window regulators, etc. Having low power, however, miniature motors could readily be overloaded (stalled in extreme cases) when a trifling trouble (such as rusting, entry of foreign matter, etc. ) occurs in the driven part thereof, or when the driven part reaches its operating limit. This leads to unwanted overheating, or burning of the windings of the armature 3.

Figure 2:
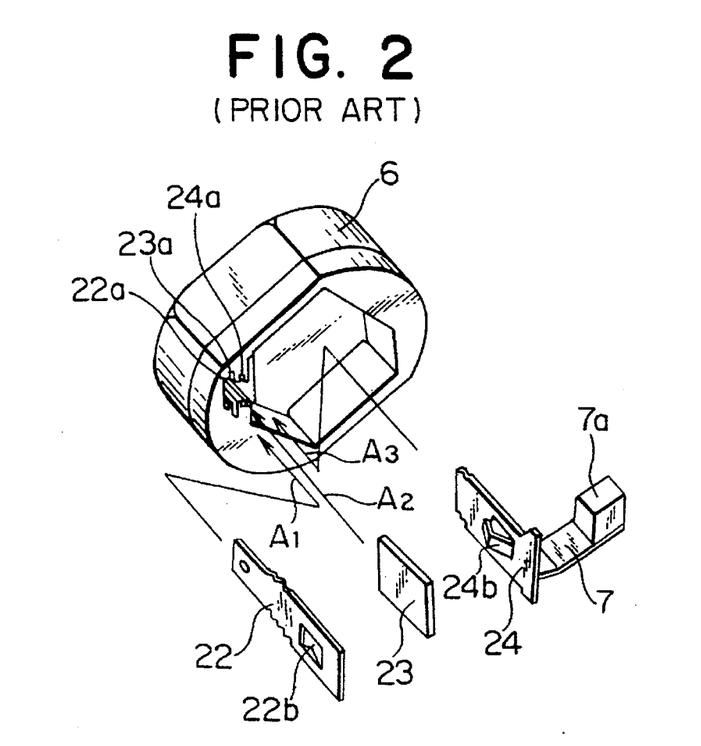
FIG. 2 is a partially exploded perspective view illustrating an example of miniature motor having a positive temperature coefficient resistor.
Figure 3:
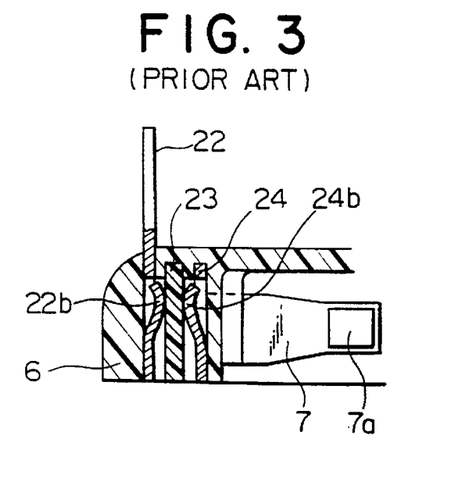
FIGS. 3 and 4 are enlarged cross-sectional views illustrating the state where the component members in FIG. 2 are assembled.
Figure 4:
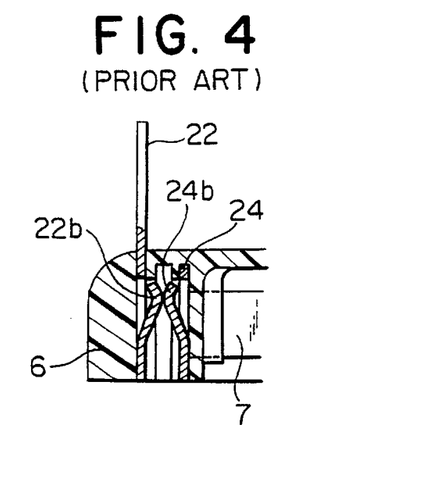

As a measure to solve the aforementioned drawbacks, means for feeding power to the armature 3 via a positive temperature coefficient resistor has heretofore been used. FIG. 2 is a partially exploded perspective view illustrating an example of miniature motor having a positive temperature coefficient resistor, and FIGS. 3 and 4 are enlarged cross-sectional views of the essential part illustrating the state where component members in FIG. 2 are assembled: both being the prior art proposed by the present applicant et al. (refer to Japanese Published Unexamined Utility Model Application No. Hei-2(1990)-41664).

In FIGS. 2 through 4, numeral 22 denotes an input terminal fixedly fitted to the case cap 6. Numeral 23 refers to a positive temperature coefficient resistor formed into a quadrilateral strip shape, for example, with both sides thereof coated with electrodes (not shown). Numeral 24 denotes a brush base having a power feeding brush piece 7a provided at the free end thereof and connected to the brush 7 integrally or in such a manner as to ensure electrical continuity.

Grooves 22a, 23a and 24a having contours corresponding to the cross-sectional shape and dimensions of the input terminal 22, the positive temperature coefficient resistor 23 and the brush base 24, respectively, are provided on the case cap 6 in a mutually adjoining and almost parallel manner. The groove 22a are provided by passing through the case cap 6, while the other grooves 23a and 24a are provided so that they are opened to the inner side surface of the case cap 6.

Lug pieces 22b and 24b are provided on the input terminal 22 and the brush base 24 at the respective positions thereof opposing to the positive temperature coefficient resistor 23. The input terminal 22, the positive temperature coefficient resistor 23 and the brush base 24 of the aforementioned construction are fixedly fitted by inserting them into the grooves 22a, 23a and 24a provided on the case cap 6 in directions as shown by arrows $A_1$, $A_2$ and $A_3$, respectively. Though not shown in the figures, the other input terminal and brush base are also fixedly fitted in the same manner so as to form their respective pairs, together with the input terminal 22 and the brush base 24.

By assembling the components in the aforementioned manner, the positive temperature coefficient resistor 23 is held by the lug pieces 22b and 24b provided on the input terminal 22 and the brush base 24, and performs predetermined functions, as shown in FIG. 3. Measures for preventing overheat may not be required, depending on the mode of use of the miniature motor. In such a case, the lug pieces 22b and 24b, which have sufficient resiliency and have been preloaded to a considerably large degree, can be brought into direct contact with each other, thereby ensuring electrical continuity merely by extracting the positive temperature coefficient resistor 23, as shown in FIG. 4.

Figure 5:
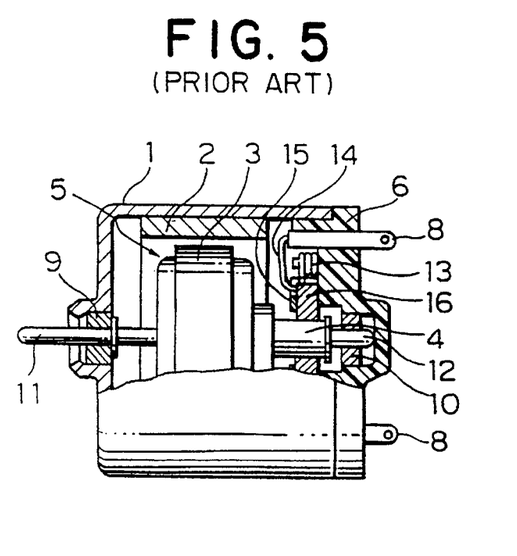
FIG. 5 is a longitudinal sectional front view illustrating another example of miniature motor of a conventional type.

FIG. 5 is a longitudinal sectional front view illustrating the essential part of another embodiment of a miniature motor of a conventional type. Like parts are indicated by like numerals shown in FIG. 1. In FIG. 5, numeral 16 denotes a brush formed into a hollow quadrangular prism shape having a square or rectangular cross-section, for example, and slidably fitted to a brush holder 15 provided on the inside end face of the case cap 6 so as to make sliding contact with the commutator 4.

Numeral 13 denotes a spring for forcing the brush 16 onto the commutator 4. Numeral 8 denotes an input terminal passed through and fixedly fitted to the case cap 6, and electrically connected to the brush 16 via a pig-tail wire 14 on the inside end of the case cap 6.

With the aforementioned construction, when electric current is fed from the input terminals 8 and 8 to the armature 3 via the pig-tail wires 14 and 14, the brushes 16 and 16, and the commutator 4 constituting the rotor 5, rotating force is imparted to the armature 3 placed in a magnetic field formed by the permanent magnet 2 fixedly fitted to the inner circumferential surface of the case 1, causing the rotor 5 to rotate and external equipment (not shown) to be driven via the output-side shaft 11.

Figure 6:
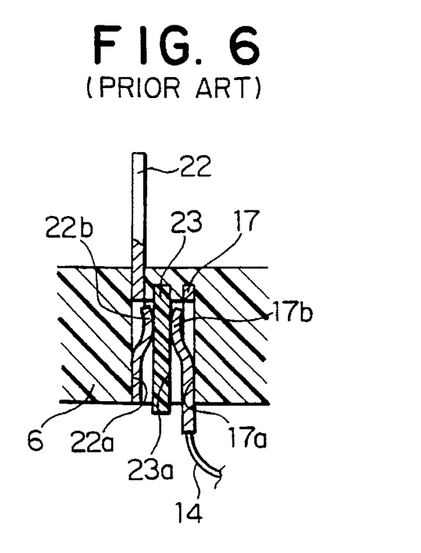
FIG. 6 is an enlarged cross-sectional view illustrating the input terminal shown in FIG. 5 and the vicinity thereof.

Even in the miniature motor shown in FIG. 5, means of providing a positive temperature coefficient resistor is adopted as a measure for preventing overheat. FIG. 6 is an enlarged cross-sectional view of the essential part of the input terminal shown in FIG. 5 and the vicinity thereof, corresponding to FIG. 3 above. Like parts are indicated by like numerals shown in FIG. 3.

In FIG. 6, numeral 17 denotes a connecting piece having a lug piece 17b provided at a position facing the positive temperature coefficient resistor 23, and fixedly fitted into a groove 17a provided on the case cap 6. The lower end of the connecting piece 17 is connected to the pig-tail wire 14 for electrically connecting to the brush 16 shown in FIG. 5. With the aforementioned construction, the positive temperature coefficient resistor 23 is held by lug pieces 22b and 17b provided on the input terminal 22 and the connecting piece 17, and performs the predetermined function, in the same manner as shown in FIG. 3.

In the miniature motor having the aforementioned construction, the positive temperature coefficient resistor 23 is held by the lug pieces 22b and 24b or 17b provided on the input terminal 22, the brush base 24 or the connecting piece 17. In this construction, however, the positive temperature coefficient resistor 23 may fall from the case cap 6 during service due to vibration or other external forces because the holding force is given only by frictional force.

To increase the holding force, the resiliency of the lug pieces 22b, 24b and 17b can be increased, but too large a resiliency would increase the pushing force required to insert the positive temperature coefficient resistor 23 between the lug pieces 22b and 24b or 17b. This not only makes the insertion of the positive temperature coefficient resistor 23 troublesome, but may cause damage to the electrode provided on the surface of the positive temperature coefficient resistor 23, leading to the loss of the functions of the positive temperature coefficient resistor 23 in extreme cases.

Although the input terminal 22, the brush base 24 and the connecting piece 17 are generally formed into a thickness of about 0.8 mm, for example, the range of controlling the resiliency imparted to the lug pieces 22b, 24b and 17b is limited due to the small size of these components. This makes it extremely difficult to set the proper hold force of the positive temperature coefficient resistor 23.

If the miniature motor of the aforementioned construction is of a specification where the positive temperature coefficient resistor 23 is omitted, the lug pieces 22b and 24b or 17b are brought into direct contact with each other, as described above. If the miniature motor of such a construction is of a specification requiring a positive temperature coefficient resistor 23, the accidental omission of the positive temperature coefficient resistor 23 during assembling operation may be overlooked in the final inspection because the lug pieces 22b and the 24b or 17b are brought into direct contact with each other, forming electrical continuity. Thus, there is a danger where a miniature motor from which the positive temperature coefficient resistor 23 is accidentally omitted may be judged as acceptable in the final inspection.

SUMMARY OF THE INVENTION

It is the first object of this invention to provide a miniature motor where a positive temperature coefficient resistor for prevent overcurrent can be positively held without damage.

It is the second object of this invention to provide a miniature motor where the extracting resistance of the positive temperature coefficient resistor can be increased.

It is the third object of this invention to provide a miniature motor where the pushing force given to the positive temperature coefficient resistor by retaining members can be controlled over a wide range and properly.

It is the fourth object of this invention to provide a miniature motor where the positive temperature coefficient resistor can be easily provided at a predetermined position.

It is the fifth object of this invention to provide a miniature motor where the presence or absence of the positive temperature coefficient resistor can be easily judged.

DETAILED DESCRIPTION OF THE EMBODIMENTS

Figure 7:
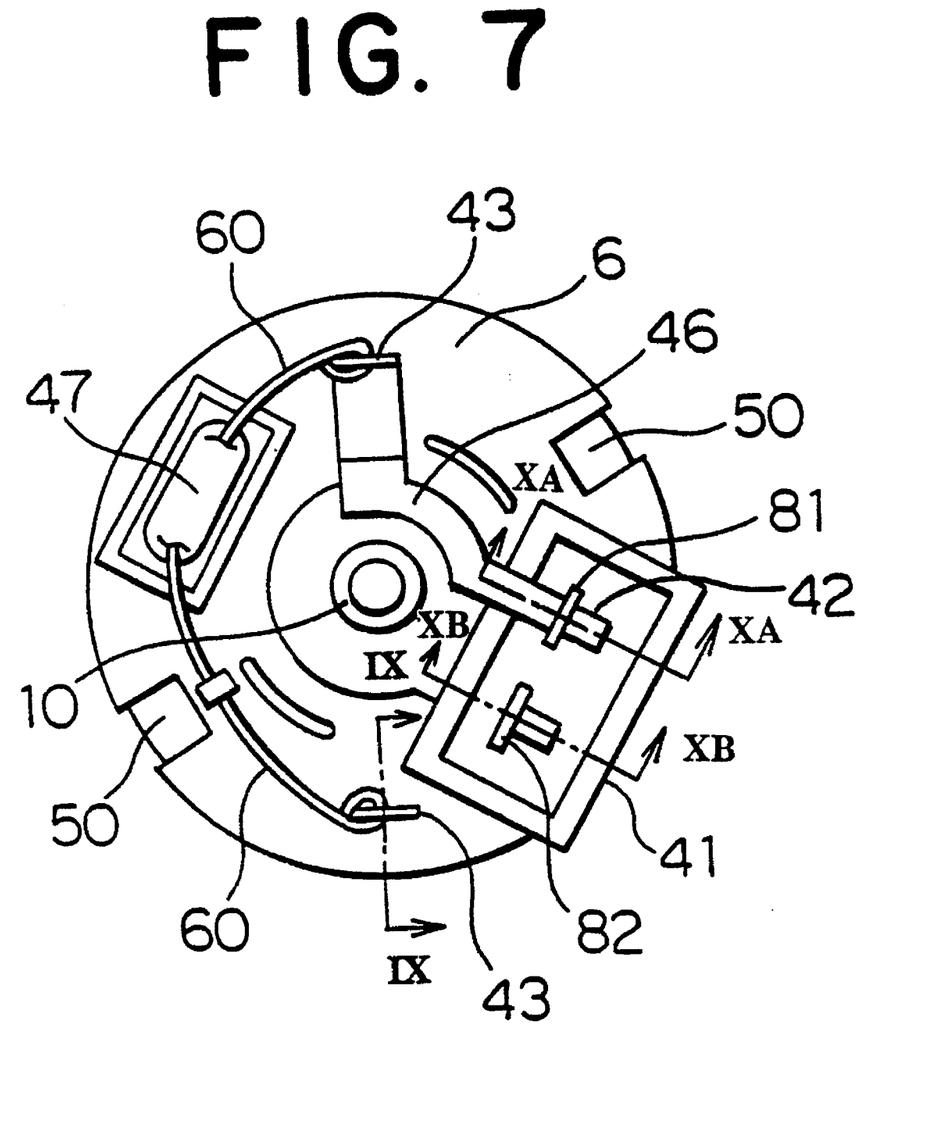
FIGS. 7 and 8 are a plan view and a bottom view illustrating the case cap in the first embodiment of this invention.
Figure 8:
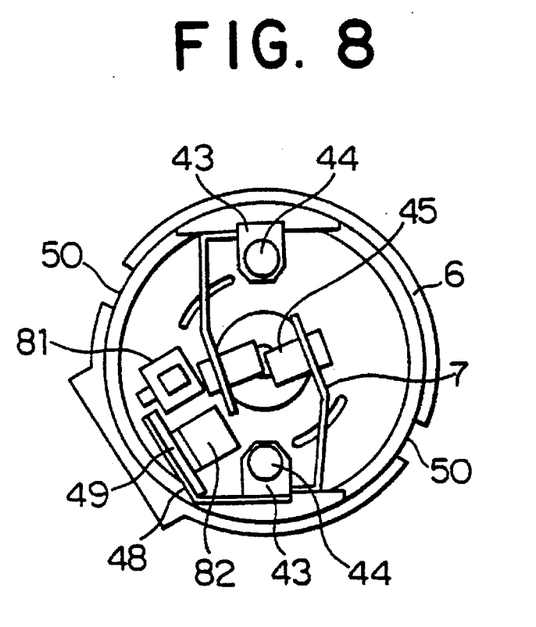
Figure 9:
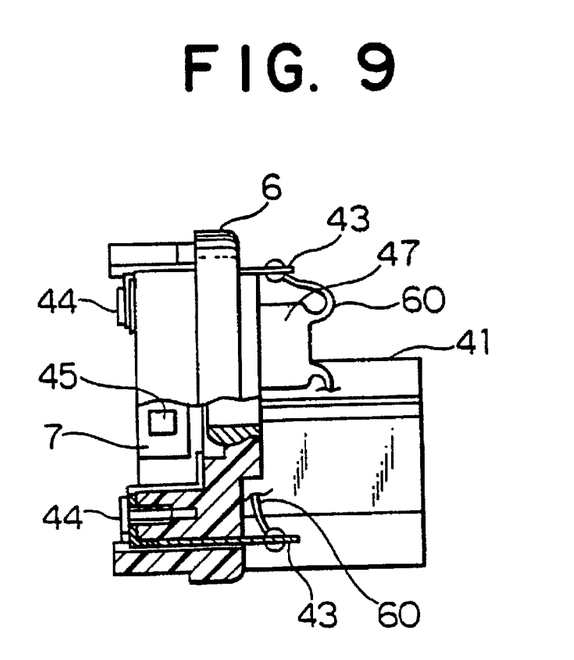
FIG. 9 is a partially cross-sectional side view taken along line IX—IX in FIG. 7.
Figure 10A:
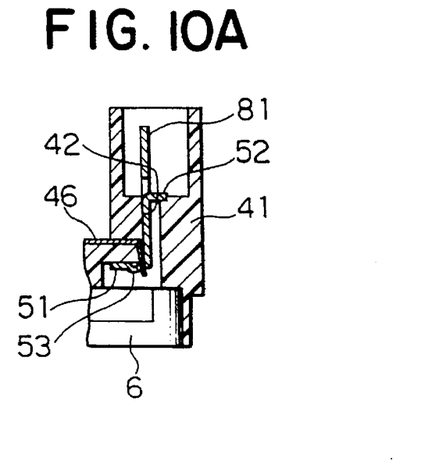
FIGS. 10A and 10B are cross-sectional views taken along lines XA—XA and XB—XB in FIG. 7, respectively.
Figure 10B:
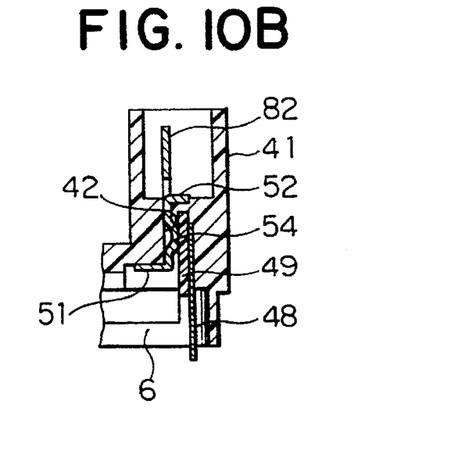

FIGS. 7 and 8 are a plan view and a bottom view illustrating a case cap in the first embodiment of this invention, FIG. 9 is a partially cross-sectional side view taken along line IX—IX in FIG. 7, and FIGS. 10A and 10B are a cross-sectional view taken along line XA—XA and a cross-sectional view taken along line XB—XB in FIG. 7. Like parts are indicated by like numerals shown in FIG. 1.

In FIGS. 7 through 10B, a case cap 6 formed of an insulating material, such as a resin material, into a substantially cup shape, and having a hollow tubular connecting member 41 integrally provided on the outer end face thereof. Numerals 81 and 82 denote a pair of input terminals formed in a manner described later, and inserted into and fixedly fitted to a through hole 42 of a T-shaped cross-section provided on the case cap 6. Free ends of the input terminals 81 and 82 are disposed in such a manner as to protrude into the connecting member 41.

Numeral 43 denotes a connecting terminal formed into a substantially L-shape, and provided on the case cap 6 via a mounting member 44 in such a manner that the connecting ends thereof are caused to protrude toward the outer end face of the case cap 6. Inside the case cap 6, the connecting terminal 43 is connected to the brush 7 formed into a substantially L-shape and having the sliding contact shoe 45 at the free end thereof. The other connecting terminal 43 and the input terminal 81 are electrically connected via an electrically conductive member 46, and a capacitor 47 is electrically connected across the connecting terminals 43 and 43 via a lead wire 60.

Numeral 48 denotes a retaining member formed of an electrically conductive material into a substantially U planer shape, as will be described later, with one leg thereof making contact with the connecting terminal 43 and the other leg thereof holding a positive temperature coefficient resistor 49 formed into a substantially quadrilateral shape, for example, in conjunction with the input terminal 82 inside the case cap 6.

With the aforementioned construction, the case 1 and the case cap 6 can be assembled together by fitting the case cap 6 to an open end of the case 1, and bending an engaging piece (not shown) provided on the open end of the case 1 toward an engaging part 50 (refer to FIG. 7) provided on the case cap 6, as shown in FIG. 1. In FIG. 7, a capacitor 47 connected across the connecting terminals 43 and 43 is used for reducing electrical noise generated from the miniature motor.

Figure 11A:
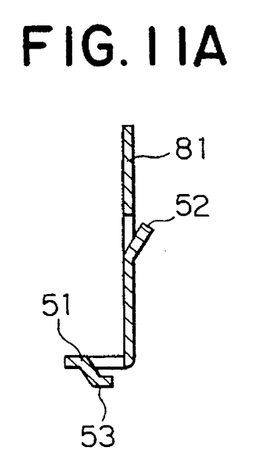
FIGS. 11A, 11B and 11C are a longitudinal sectional view, a left-hand side view and a bottom view illustrating the input terminal 81 shown in FIGS. 7, 8, 10A and 10B.
Figure 11B:
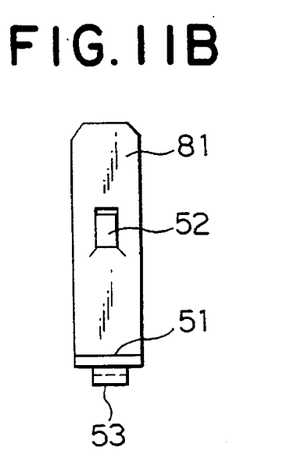
Figure 11C:
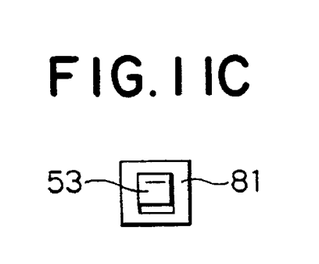
Figure 12A:
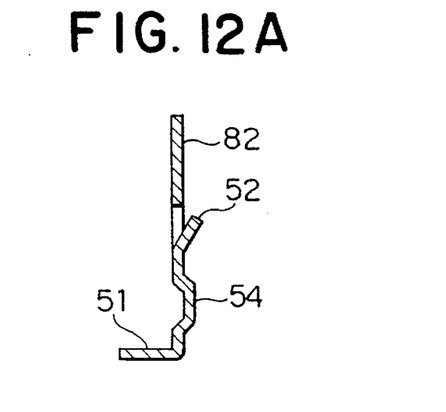
FIGS. 12A and 12B are a longitudinal sectional view and a left-hand side view illustrating the input terminal 82 shown in FIGS. 7, 8, 10A and 10B.
Figure 12B:
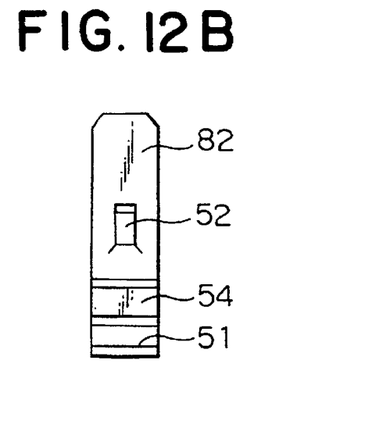

Next, the construction of the input terminals 81 and 82 will be described. FIGS. 11A through 11C are a longitudinal section view, a left-hand side view and a bottom view illustrating the input terminal 81 shown in FIGS. 7, 8, 10A and 10B. FIGS. 12A and 12B are a longitudinal sectional view and a left-hand side view illustrating the input terminal 82 shown in FIGS. 7, 8, 10A and 10B.

In FIGS. 11A through 11C, a stopper 51 is provided at the lower end of the input terminal 81 made of an electrically conductive material by forming the input terminal 81 into a substantially L-shaped cross-section. A lanced and raised lug 52 is provided at the central part of the input terminal 81, and a lanced and raised part 53 is provided on the stopper 51.

In FIGS. 12A and 12B, the input terminal 82 is made of an electrically conductive material and formed into a substantially L-shaped cross-section, and a stopper 51 is provided at the lower part of the input terminal 82 and a lanced and raised lug 52 at the central part thereof, as in the case of the input terminal 81 shown in FIGS. 11A through 11C. Numeral 54 denotes a projection provided in such a manner as to protrude between the stopper 51 and the lanced and raised lug 52 toward the side of the lance and raised lug 52. The input terminals 81 and 82 as described above should preferably be formed by press forming means.

Figures 13A, 13B:
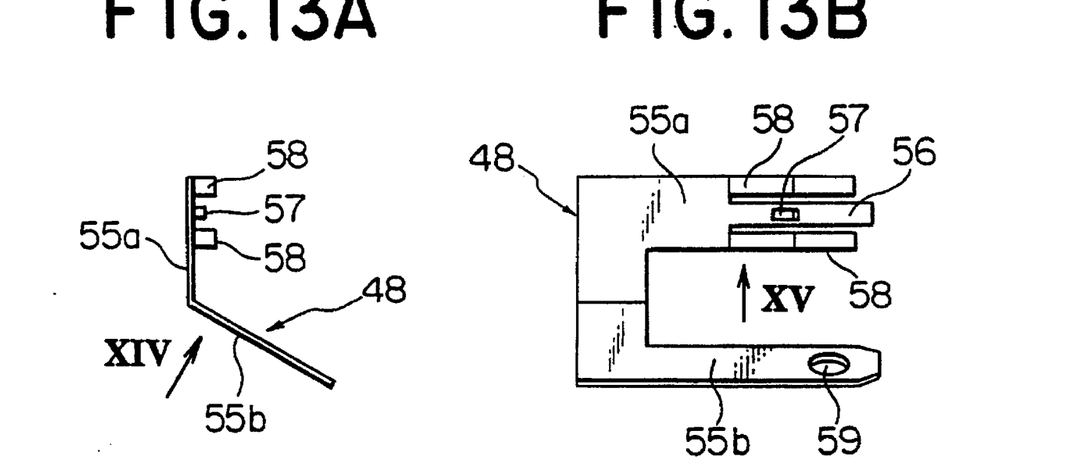
FIGS. 13A and 13B are a side view and a front view illustrating the retaining member 48 shown in FIGS. 8 and 10B.
Figure 14:
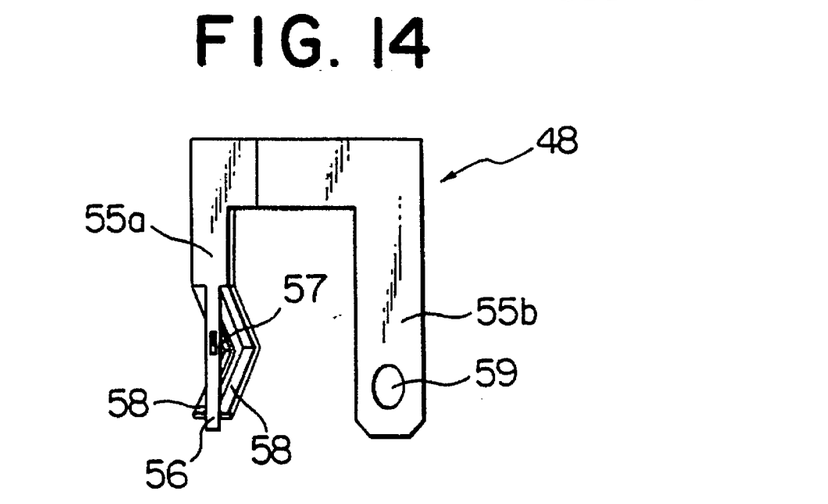
FIGS. 14 and 15 are a diagram viewed from XIV direction in FIG. 13A and a diagram viewed from XV direction in FIG. 13B, respectively.
Figure 15:
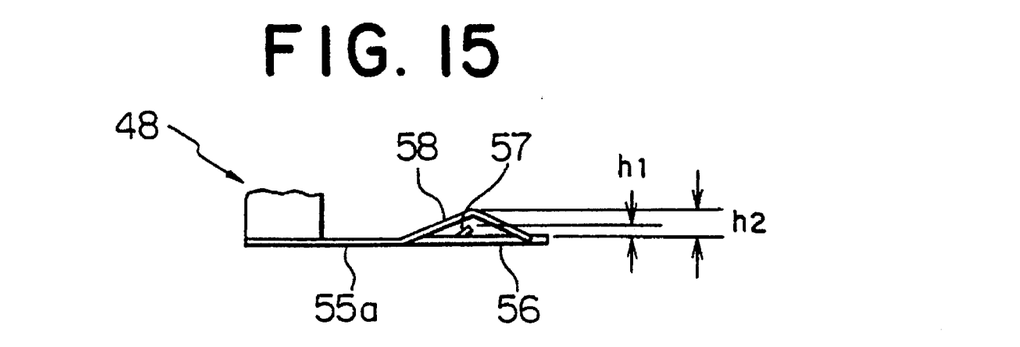

FIGS. 13A and 13B are a side view and a front view illustrating the retaining member 48 shown in FIGS. 8 and 10B. FIGS. 14 and 15 are a diagram viewed from XIV direction in FIG. 13A and a diagram viewed from XV direction in FIG. 13B. In FIGS. 13A through 15, the retaining member 48 is made of an electrically conductive material and formed into a substantially U shape in the plane shape thereof, having legs 55a and 55b. The angle between the legs 55a and 55b is 120°, for example, in FIG. 13A.

The tip of the leg 55a is formed into a fork shape, or a trifurcated piece, for example, with the central prong 56 having a lanced and raised lug 57, and the two side prongs 58 being bent and protruded toward the projected side of the lanced and raised lug 57 to form protruded retaining parts. Numeral 59 denotes a hole provided at the tip of the other leg 55b to improve the engaging action of the retaining member 48 with the case cap 6 (refer to FIGS. 7 through 10B), as will be described later.

The protruded height $h_2$ of the retaining part formed by the two side prongs 58 from the central prong 56 should preferably be made larger than the height $h_1$ of the lanced and raised lug 57.

With the aforementioned construction, the method of installing the input terminals 81 and 82 and the retaining member 48 on the case cap 6 will be described in the following. First, the input terminals 81 and 82 are inserted into the through hole 42 from the inside, that is, from the bottom of the case cap 6, shown in FIGS. 10A and 10B. In this case, it is quite easy to insert the input terminals 81 and 82 each having lanced and raised lug 51 at the central part thereof into the through hole 42, as shown in FIGS. 11A, 11B, 12A and 12B, because the through hole 42 is formed into a T-shaped cross-section, as shown in FIG. 7.

After the input terminals 81 and 82 have been inserted into the through hole 42 until the stoppers 51 and 51 thereof reach the end face of the case cap 6, the lanced and raised lugs 52 and 52 are bent to almost right angle with respect to the surface of the input terminals 81 and 82 to fixedly fit the input terminals 81 and 82 to the case cap 6. By doing this, the longitudinal extracting resistance of the input terminals 81 and 82 can be maintained. When a jig is used to bend the lanced and raised lugs 52 and 52, the jig never interferes with the connecting member 41 near the input terminals 81 and 82 because bending operation is performed in the longitudinal direction of the input terminals 81 and 82.

After the input terminals 81 and 82 have been fixedly fitted, the lanced and raised part 53 of the input terminal 81 is bent back to crimp an end of the electrically conductive member 46 to electrically connect the input terminal 81 to the electrically conductive member 46, as shown in FIG. 10A. Next, the retaining member 48 is fixedly fitted to the case cap 6 via the mounting member 44 by inserting into a predetermined position, together with the connecting terminal 43 and the brush 7, as shown in FIG. 8. By doing this, the aforementioned members are positively connected mechanically and electrically.

Since the leg 55a of the retaining member 48 as shown in FIGS. 13A through 15 faces the input terminal 82 with a slight gap, as shown in FIGS. 8 and 10B, it is easy to insert the positive temperature coefficient resistor 49 between both. At the same time, as the positive temperature coefficient resistor 49 is inserted, the prongs 58 and the lanced and raised lug 57, which have been bent or raised in free state, are elastically deformed to a horizontal or almost horizontal state, as shown in FIGS. 14 and 15.

Thus, the positive temperature coefficient resistor 49 can be positively held between the retaining member 48 and the projection 54 of the input terminal 82. Although the positive temperature coefficient resistor 49 is involved with a creep phenomenon where the resistor area held by the projection 54 of the input terminal 82 is reduced due to tripping, both the prongs 58 and the lanced and raised lug 57 can satisfactorily follow with changes in the thickness of the positive temperature coefficient resistor 49 because the prongs 58 and the lanced and raised lug 57 come in contact with, or are forced onto the positive temperature coefficient resistor 49 in elastically deformed state. Thus, the contact or pressing state is maintained, and the contact resistance between both can be kept constant.

Even if external force to pull the positive temperature coefficient resistor 49 is exerted in this state, the lanced and raised lug 57 has an effect of cutting into the surface of the electrode of the positive temperature coefficient resistor 49. This results in increased extracting resistance and improved reliability.

In this case, assuming that the size of a gap between the surface of the projection 54 of the input terminal 82 and the retaining member 48 in free state before inserting the positive temperature coefficient resistor 49 in FIG. 10B is g, and the thickness of the positive temperature coefficient resistor 49 is t, the relationship between g and t should be such that g<t. The datum for the gap size g is the upper end of the prongs 58 and the lanced and raised lug 57 in FIG. 15.

After the components are assembled in the aforementioned manner, the capacitor 47 is connected by soldering, for example, to the connecting terminals 43 and 43 via the lead wires 60 and 60, as shown in FIGS. 7 and 9. In this case, the end of the electrically conductive member 46 is also soldered to the connecting terminal 43, together with the lead wire 60, to maintain electrical connection.

Figure 16A:
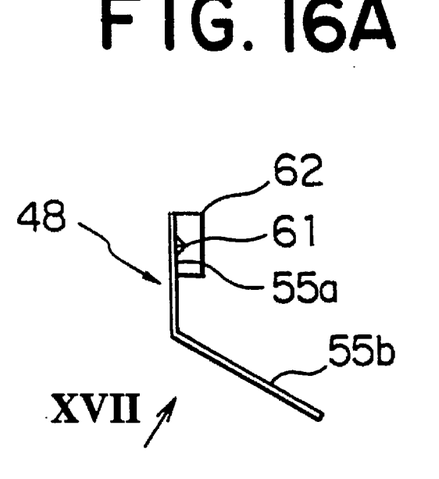
FIGS. 16A and 16B are a side view and a front view illustrating the retaining member 48 in the second embodiment of this invention.
Figure 16B:
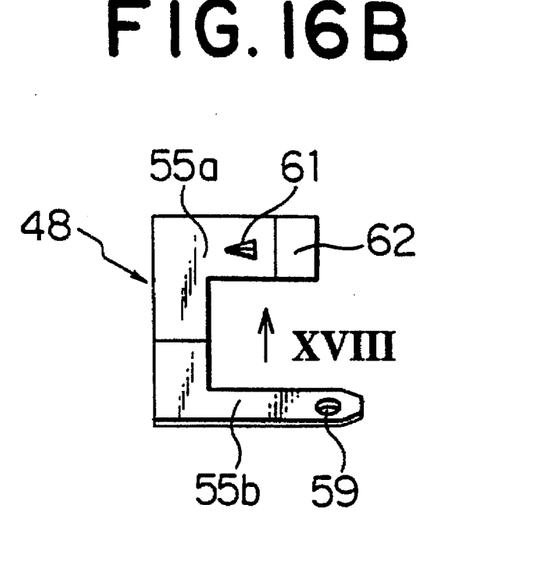
Figure 17:
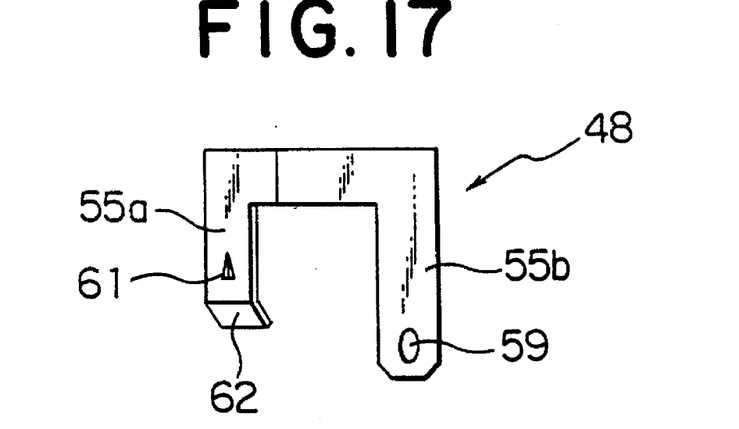
FIGS. 17 and 18 are a diagram viewed from XVII direction in FIG. 16A and a diagram viewed from IVIII direction in FIG. 16B.
Figure 18:
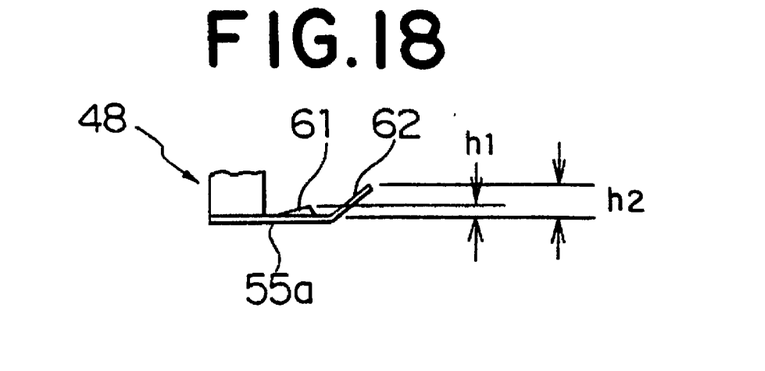

Next, FIGS. 16A and 16B are a side view and a front view illustrating the retaining member 48 in the second embodiment of this invention. FIGS. 17 and 18 are a diagram viewed from XVII direction in FIG. 16A and a diagram viewed from XVIII direction in FIG. 16B In FIGS. 16A through 18, like parts are indicated by like numerals shown in FIGS. 13A through 15.

In FIGS. 16A through 18, the retaining member 48 is made of an electrically conductive, elastic metallic material similar to that shown in FIGS. 13A through 15, and formed into a substantially U shape in the plane shape thereof, with legs 55a and 55b disposed at an angle of 120°, for example, in FIG. 16A.

The leg 55a has a lanced and raised part 61 at a flat part near the tip 62 thereof, and the tip 62 is bent toward the same side as the lanced and raised part 61 to form a retaining part. The height $h_2$ of the top edge of the tip 62 from the leg 55a should preferably be made larger than the height $h_1$ of the top edge of the lanced and raised part 61 from the leg 55a, as shown in FIG. 18.

Figure 19A:
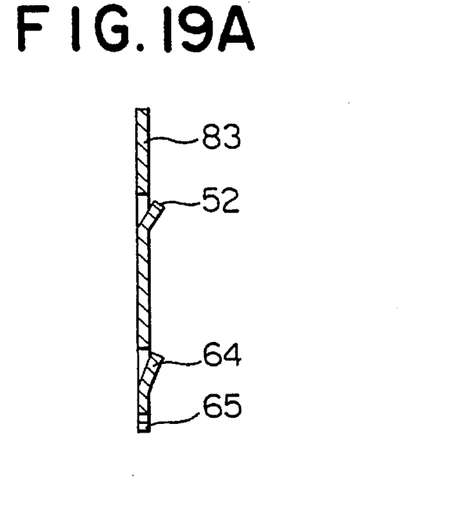
FIGS. 19A and 19B are a longitudinal sectional view and a right-hand side view illustrating an example of input terminal in the second embodiment of this invention.
Figure 19B:
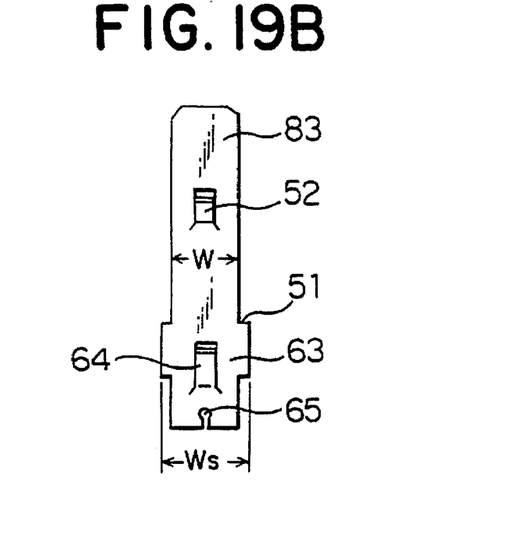

FIGS. 19A and 19B are a longitudinal sectional view and a right-hand side view illustrating the input terminal in the second embodiment of this invention. Like parts are indicated by like numerals used in FIGS. 11A through 12B. In FIGS. 19A and 19B, the input terminal 83 is formed of an electrically conductive material similar to that shown in FIGS. 11A through 12B, so that a press-fit part 63 having a width $W_S$ larger than the width W of the intermediate part thereof provided in the vicinity of the lower end thereof, and a stopper 51 at the upper shoulder thereof.

Numeral 64 denotes a lance and raised lug provided near the lower end of the input terminal 83 in such a manner as to protrude to the same side as the lanced and raised lug 52. Numeral 65 denotes a slit provided for connecting a capacitor or any other functional element.

The aforementioned input terminal 83 should preferably be formed by press forming means. Although two input terminals 83 and 83 are usually used as a pair (refer to the input terminals 81 and 82 in FIGS. 7 and 8), the lanced and raised lug 64 may suffice to be provided on any one of the input terminals 83 and 83. Thus, the material for a pair of the input terminals 83 and 83 can be made common, and two pieces of the input terminals shown in FIGS. 19A and 19B can be used as a common component by taking into consideration the shape of the inner end face of the case cap 6 (not shown. Refer to FIGS. 7 through 10B).

Figure 20A:
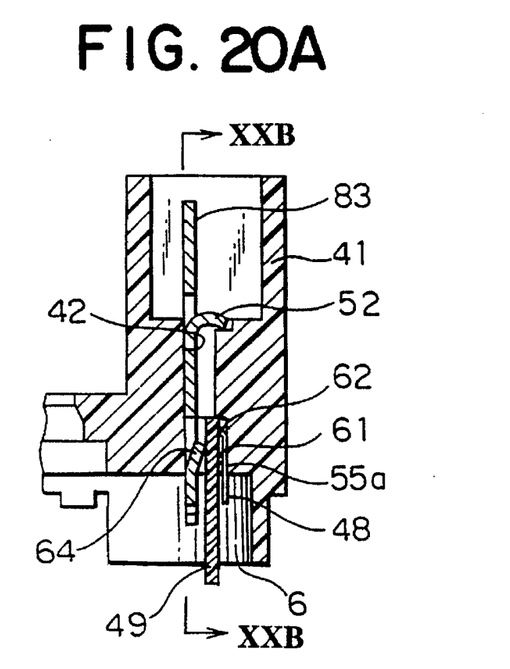
FIG. 20A is a cross-sectional view illustrating the state where the input terminal 83 and the retaining member 48 in the second embodiment of this invention are mounted on the case cap 6.
Figure 20B:
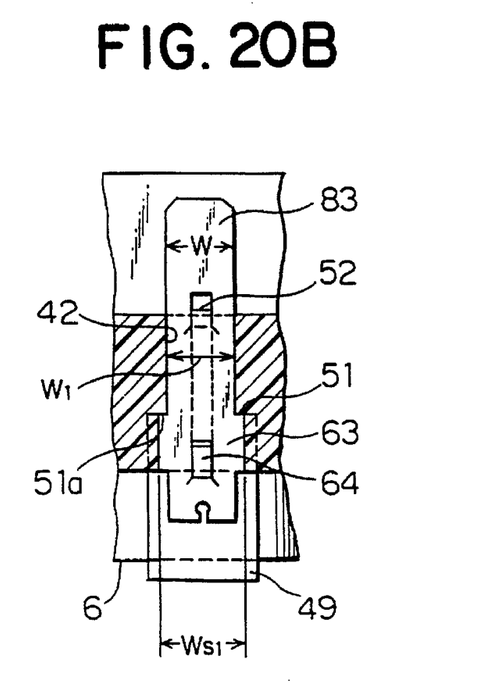
FIG. 20B is a partially cross-sectional view taken along line XXB—XXB in FIG. 20A.

FIG. 20A is a cross-sectional view, corresponding to FIG. 10B, illustrating the state where the input terminal 83 and the retaining member 48 in the second embodiment of this invention are mounted on the case cap 6. FIG. 20B is a cross-sectional view taken along line XXB—XXB in FIG. 20A. Like parts are indicated by like numerals used in FIGS. 10A, 10B and 16A through 19B.

In FIGS. 20A and 20B, the through hole 42 is formed into a T-shaped cross-section, as in the case of FIGS. 10A and 10B, having a width $W_1$ at the upper part thereof and a width $W_{S1}$ at the lower part thereof. In this case, the relationship among the widths $W_1$ and $W_{S1}$, the width W of the intermediate part of the input terminal 83 shown in FIG. 19B and the width $W_S$ of the press-fit part 63 should be such that $W_1 \geq W$, and $W_{S1} \leq W_S$, and the range of the through hole 42 which is formed into the width $W_{S1}$ should be matched with the longitudinal size of the press-fit part 63.

With the aforementioned construction, the input terminal 83 is inserted into the through hole 42 from the inside, that is, from the bottom of the case cap 6, as shown in FIGS. 20A and 20B. Since the through hole 42 is formed in the aforementioned manner, it is quite easy to insert the input terminal 83 having the lanced and raised lug 52 provided on the intermediate part thereof into the through hole 42, as shown in FIGS. 19A and 19B.

The longitudinal position of the input terminal 83 can be maintained by press fitting the press-fit part 63 of the input terminal 83 and bringing the stopper 51 all the way to a boundary part 51a. Then, the input terminal 83 can be fixedly fitted to the case cap 6 by bending the lanced and raised lug 52 to almost right angle with the surface of the input terminal 83, as in the case of that shown in FIGS. 10A and 10B. The other input terminal 83 forming a pair is electrically connected to the electrically conductive member 46 as shown in FIGS. 7, 10A and 10B by crimping an end of the electrically conductive member 46.

The retaining member 48 formed in such a manner as shown in FIGS. 16A through 18 is fixedly fitted to the case cap 6 as shown in FIG. 20A, as in the case of the aforementioned first embodiment of this invention. In this state, the positive temperature coefficient resistor 49 can be easily inserted between the retaining member 48 and the input terminal 83 since the leg 55a of the retaining member 48 faces the input terminal 83 with a slight gap.

By inserting the positive temperature coefficient resistor 49 in the aforementioned manner, the tip 62 that has been bent or raised in free state, as shown in FIGS. 17 and 18, is elastically deformed into horizontal or almost horizontal state, as shown in FIG. 20A, causing the edge of the tip 62 to come in contact with or force onto the surface of the positive temperature coefficient resistor 49. The lanced and raised projection 61 provided on the leg 55a acts to cut into the surface of the positive temperature coefficient resistor 49.

Thus, the positive temperature coefficient resistor 49 can be positively held between the input terminal 83 and the retaining member 48. Even when external pulling force is exerted onto the positive temperature coefficient resistor 49 in this state, the extracting resistance can be increased and reliability can be improved because the lanced and raised projection 61 provided on the leg 55a of the retaining member 48 and the lanced and raised lug 64 provided on the input terminal 83 act to cut into the surface of the positive temperature coefficient resistor 49.

In this case, assuming the gap between the lanced and raised lug 64 of the input terminal 83 before the positive temperature coefficient resistor 49 is inserted in position in FIG. 20A, and the lanced and raised projection 61 of the retaining member 48 in free state and the edge of the tip 62 is g, and the thickness of the positive temperature coefficient resistor 49 is t, the relationship between g and t should be g<t.

The positive temperature coefficient resistor 49 has a characteristic that the thickness of the part thereof being held is reduced due to tripping, as described earlier. In this embodiment, however, not only the positive temperature coefficient resistor 49 is held by the lanced and raised projection 61 and the lanced and raised lug 64 in FIG. 20A, but also the elastic deformation of the tip 62 formed in such a manner as shown in FIG. 18 causes the edge of the tip 62 to come in contact with, or force onto the surface of the positive temperature coefficient resistor 49. Thus, the positive temperature coefficient resistor 49 can be held positively without changing the contact resistance between the retaining member 48 and the positive temperature coefficient resistor 49.

Figure 21A:
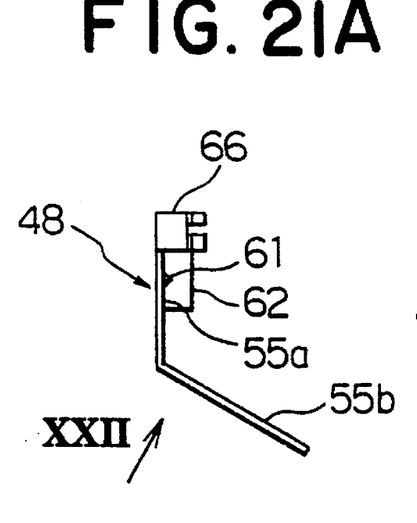
FIGS. 21A and 21B are a side view and a front view illustrating the retaining member 48 in the third embodiment of this invention.
Figure 21B:
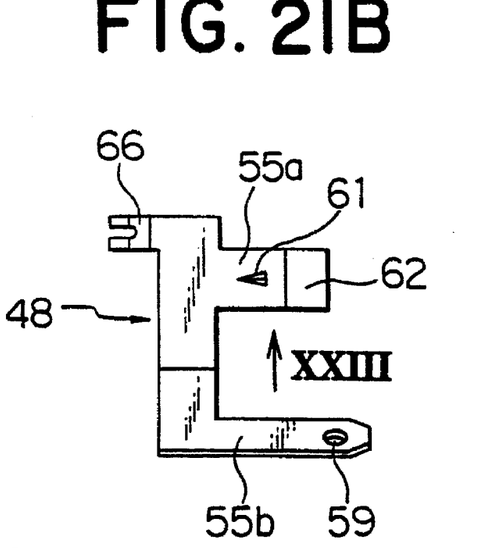
Figure 22:
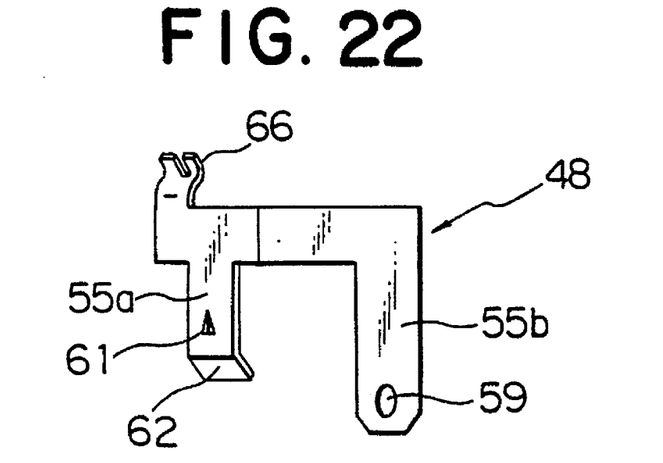
FIGS. 22 and 23 are a diagram viewed from XXII direction in FIG. 21A and a diagram viewed from XXIII direction in FIG. 21B.
Figure 23:
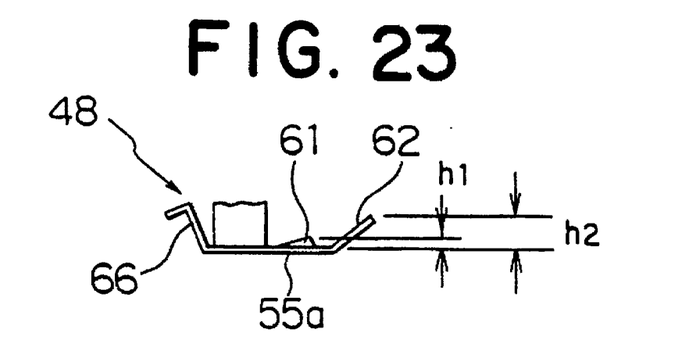

FIGS. 21A and 21B are a side view and a front view illustrating the retaining member 48 in the third embodiment of this invention. FIG. 22 and 23 are a diagram viewed from XXII direction in FIG. 21A and a diagram viewed from XXIII direction in FIG. 21B. In FIGS. 21A through 23, like parts are indicated by like numerals used in FIGS. 16A through 18.

In FIGS. 21A through 23, numeral 66 denotes a pushing piece formed in such a manner that the pushing piece 66 protrudes in the opposite direction to the leg 55a having the lanced and raised projection 61 and the L-shaped bent part thereof is on the same side as the lanced and raised projection 61. Other construction is the same as that shown in FIGS. 16A through 18.

Figure 24:
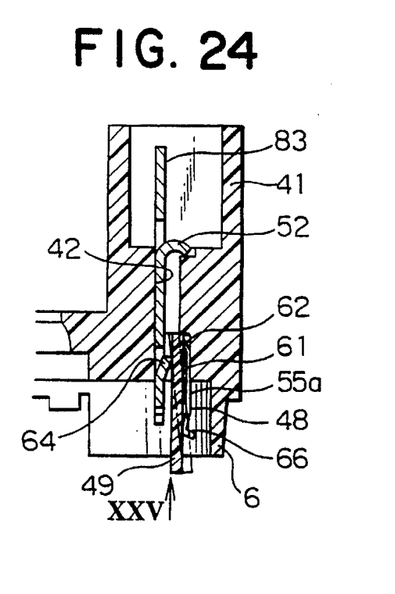
FIG. 24 is a cross-sectional view illustrating the state where the retaining member 48 in the third embodiment of this invention is mounted on the case cap 6.

FIG. 24 is a cross-sectional view illustrating the state where the retaining member 48 in the third embodiment of this invention is mounted on the case cap 6, corresponding to FIG. 20A. Like parts are indicated by like numerals shown in FIG. 20A.

In FIG. 24, the input terminal 83 is inserted into the through hole 42 from the inside, that is, from the bottom of the case cap 6, and fixedly fitted by bending the lanced and raised lug 52, as in the case of the embodiment shown in FIGS. 20A and 20B. The retaining member 48 formed in such a manner as shown in FIGS. 21A through 23 is fixedly fitted to the case cap 6. In this state, the leg 55a of the retaining member 48 faces the input terminal 83 with a slight gap, as in the case of the first and second embodiments. The positive temperature coefficient resistor 49 can therefore be inserted between the leg 55a of the retaining member 48 and the input terminal 83.

After the positive temperature coefficient resistor 49 has been inserted in the aforementioned manner, the lanced and raised projection 61 acts to cut into the surface of the positive temperature coefficient resistor 49, and the tip 62 comes in elastic contact with the surface of the positive temperature coefficient resistor 49. Thus, the positive temperature coefficient resistor 49 can be positively held.

The positive temperature coefficient resistor 49 may be displaced due to creep, as shown by chain dashes in FIG. 24 because the positive temperature coefficient resistor 49 has a characteristic that the thickness of the part thereof being held is reduced due to tripping, as described earlier. In this invention, however, the pushing piece 66 provided integrally with the retaining member 48 prevents the positive temperature coefficient resistor 49 from being displaced due to stress relieving or creep and positively holds the positive temperature coefficient resistor 49 at a predetermined position by elastically pushing the surface of the positive temperature coefficient resistor 49. Thus, electrical contact can be maintained between the positive temperature coefficient resistor 49 and the input terminal 83 and the retaining member 48.

Figure 25:
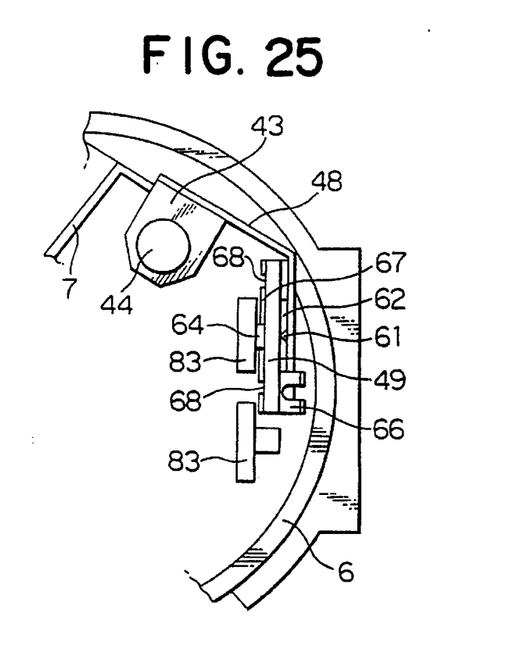
FIG. 25 is an enlarged bottom view of the essential part of the case cap 6 in the fourth embodiment of this invention.

FIG. 25 is an enlarged bottom view illustrating the essential part of the case cap 6 in the fourth embodiment of this invention, corresponding to a diagram viewed from XXV direction in FIG. 24. Like parts are indicated by like numerals shown in FIGS. 8 and 24. In FIG. 25, numeral 67 denotes a hole formed into an almost rectangular shape for housing the positive temperature coefficient resistor 49. Numeral 68 denotes a projection provided on the inside wall of the hole 67 on the side of the input terminal 83 in such a manner that the projection 68 holds the lanced and raised lug 64 provided on the input terminal 83 and comes in contact with the surface of the positive temperature coefficient resistor 49 on both sides in the across-the-width direction of the input terminal 83. The projected height of the projection 68 is made slightly smaller than the projected height of the lanced and raised lug 64 of the input terminal 83.

With the above construction, the positive temperature coefficient resistor 49 can be positively held because the positive temperature coefficient resistor 49, when inserted into the hole 67, is held by the input terminal 83 and the retaining member 48, and one surface of the positive temperature coefficient resistor 49 comes in contact with the projections 68 and 68 to prevent the input terminal 83 from being rotated around the lanced and raised lug 64 in FIG. 25 even when pushed by the lanced and raised projection 61, the tip 62 and the pushing piece 64 of the retaining member 48. The projection 68 may be provided only on the side of the pushing piece 66.

Figure 26:
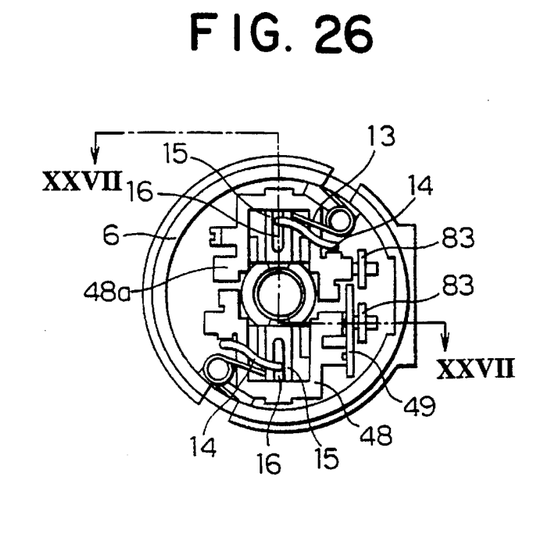
FIG. 26 is a bottom view illustrating the case cap 6 in the fifth embodiment of this invention.
Figure 27:
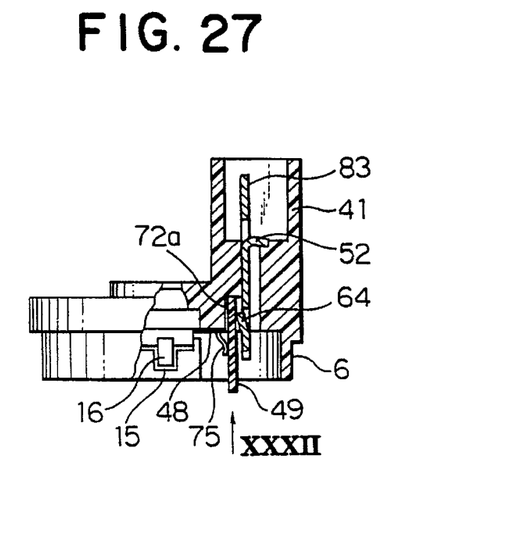
FIG. 27 is a cross-sectional view taken along line XXVII—XXVII in FIG. 26.

FIG. 26 is a bottom view illustrating the case cap in the fifth embodiment of this invention. FIG. 27 is a cross-sectional view taken along line XXVII—XXVII in FIG. 26. Like parts are indicated by like numerals shown in FIGS. 5, 24 and 25. In FIGS. 26 and 27, a brush holder 15 is formed into a substantially U-shaped cross-section, and slidably houses a brush 16 formed into a rectangular cross-section.

The retaining member 48 is made of an electrically conductive material, as will be described later, for holding the positive temperature coefficient resistor 49, in conjunction with one input terminal 83. Numeral 48a is an electrically conductive member made of an electrically conductive material and formed into the same shape as the retaining member 48 for connecting the other input terminal 83. The retaining member 48, the connecting member 48a and the brush 16 are electrically connected with each other via pig-tail wires 14. Numeral 72a denotes a leg, and numeral 75 a pushing piece, both being components of the retaining member 48 formed in such a manner as will be described later.

Figure 28:
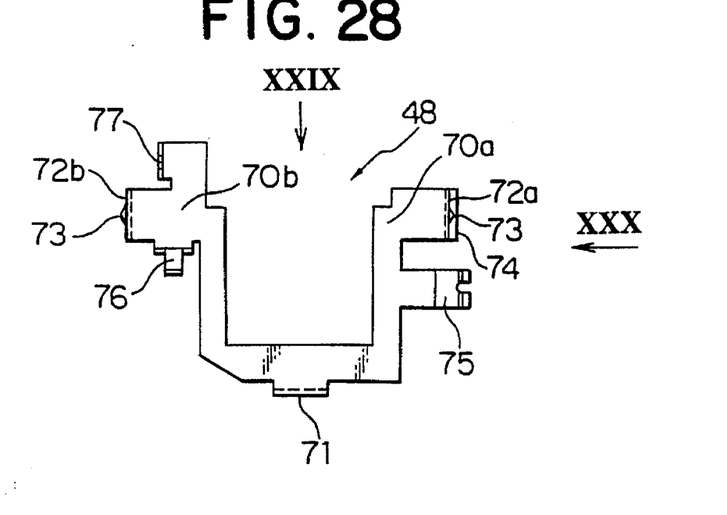
FIG. 28 is an enlarged plan view illustrating the retaining member 48 shown in FIGS. 26 and 27.
Figure 29:
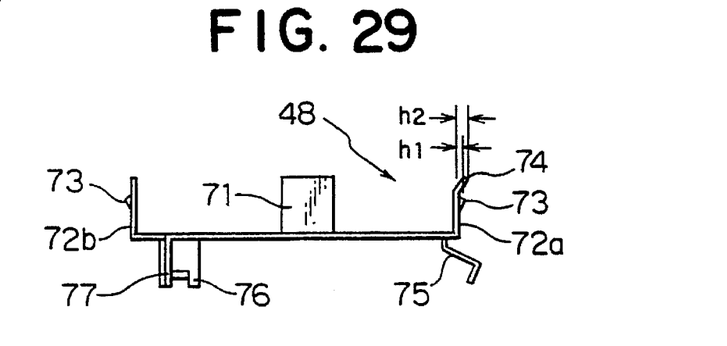
FIGS. 29 and 30 are a diagram viewed from XXIX direction and a diagram viewed from XXX direction in FIG. 28, respectively.
Figure 30:
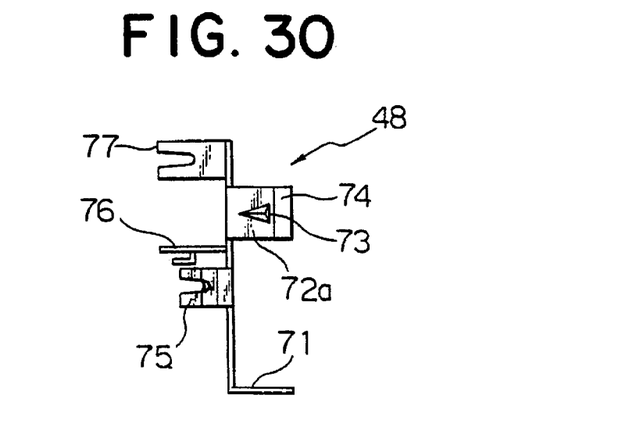

FIG. 28 is an enlarged plan view illustrating the retaining member 48 shown in FIGS. 26 and 27. FIGS. 29 and 30 are a diagram viewed from XXIX direction and a diagram viewed from XXX direction in FIG. 28. In FIGS. 28 through 30, the retaining member 48 is formed into a substantially U shape in the plane shape thereof, with the open ends thereof 70a and 70b slightly protruded outward. The protruded length of the open end 70a is made slightly smaller than the protruded length of the other open end 70b so as to provide the positive temperature coefficient resistor 49 on the side of the open end 70a, as shown in FIGS. 26 and 27.

Next, a fixed leg 71 is provided on the intermediate part of the retaining member 48, and a leg 72a and a fixed leg 72b are provided on the open ends 70a and 70b by bending the corresponding parts of the retaining member 48 upward to an angle of 90° in FIG. 29. A lanced and raised projections 73 and 73 are provided on the leg 72a and the fixed leg 72b in such a manner as to protrude outward. Retaining parts are formed by bending the tip 74 of the leg 72a to the same side as the lanced and raised projection 73. The height $h_2$ of the tip edge of the tip 74 from the leg 72a should preferably be made larger than the height $h_1$ of the lanced and raised projection 73 from the leg 72a.

Next, numeral 75 denotes a pushing piece provided near the open end 70a, which is formed in such a manner that the pushing piece 75 protrudes in the opposite direction to the leg 72a and the part thereof bent into an L shape is on the same side as the lanced and raised projection 73, as shown in FIG. 29. Numerals 76 and 77 denote terminals provided on the open end 70b by bending the corresponding parts to the same side as the pushing piece 75, as shown in FIGS. 29 and 30. The terminals 76 and 77 are for connecting a pig-tail wire 14, as shown in FIG. 26, a capacitor and other functional elements.

Figure 31A:
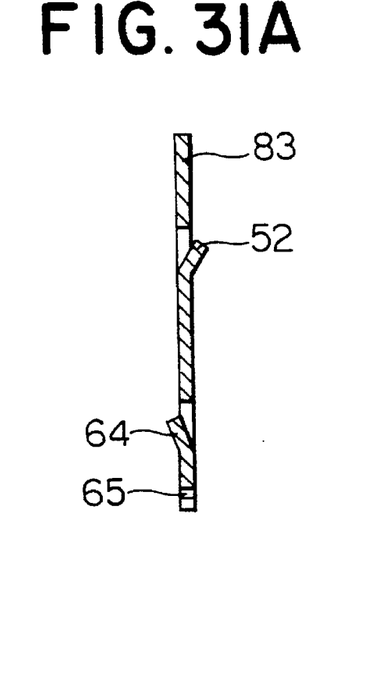
FIGS. 31A and 31B are a longitudinal sectional view and a left-hand side view illustrating the input terminal 83 shown in FIGS. 26 and 27.
Figure 31B:
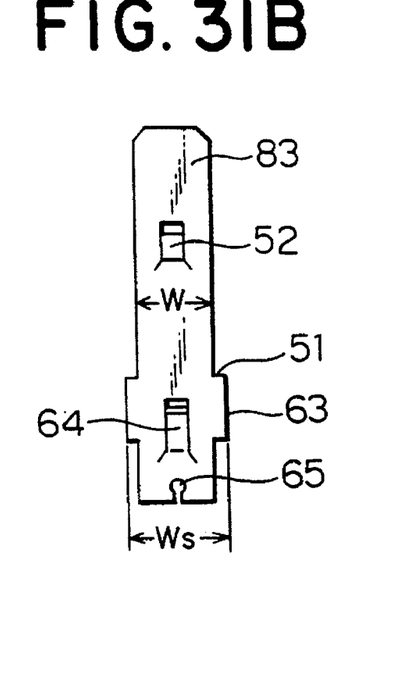

FIGS. 31A and 31B are a longitudinal sectional view and a left-hand side view illustrating the input terminal 83 shown in FIGS. 26 and 27. Like parts are indicated by like numerals shown in FIGS. 19A and 19B. The construction shown in FIGS. 31A and 31B is the same as shown in FIGS. 19A and 19B, except that the lanced and raised lugs 52 and 64 are formed in such a manner as to protrude toward the opposite side to each other.

With the aforementioned construction, when the positive temperature coefficient resistor 49 is inserted between the retaining member 48 and the input terminal 83 after the retaining member 48 shown in FIGS. 28 through 30 and the input terminal 83 shown in FIGS. 31A and 31B are mounted on the case cap 6, as shown in FIGS. 26 and 27, the positive temperature coefficient resistor 49 can be positively held in the same manner as in the fourth embodiment described above. In this case, the relative positions of the leg 72a and the pushing piece 75 on the retaining member 48 holding the positive temperature coefficient resistor 49, and the lanced and raised lug 64 of the input terminal 83, as shown in FIG. 27, are exactly opposite to those in the fourth embodiment shown in FIG. 24, but this embodiment can achieve the same operation of retaining the positive temperature coefficient resistor 49 as the fourth embodiment as achieved with the fourth embodiment.

Figure 32:
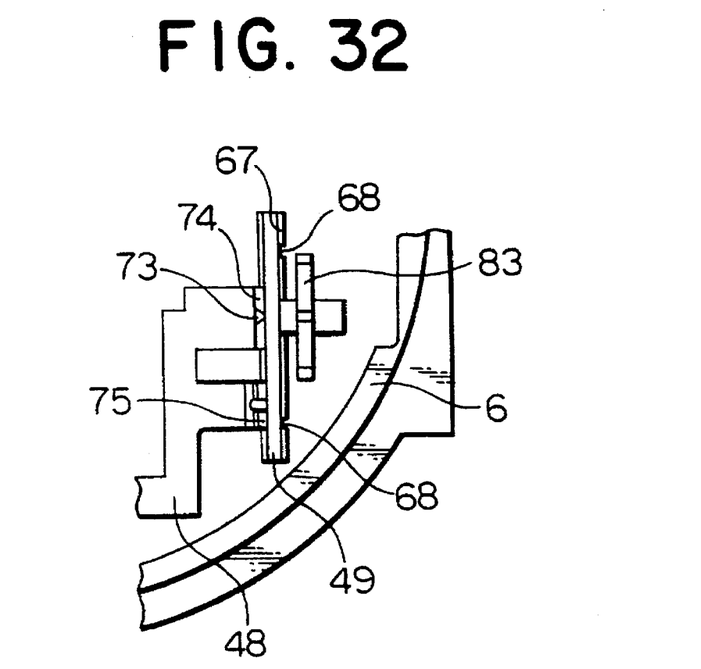
FIG. 32 is an enlarged view viewed from XXXII direction in FIG. 27.

FIG. 32 is an enlarged diagram viewed from XXXII direction in FIG. 27. Like parts are indicated by like numerals shown in FIGS. 25 through 31B. As shown in FIG. 32, the positive temperature coefficient resistor 49 can be prevented from being unwantedly rotated and can be positively held, as in the case of the fourth embodiment, by providing a projection 68 similar to that shown in FIG. 25 on the input-terminal 83 side of the hole 67 housing the positive temperature coefficient resistor 49.

This invention is not limited to the aforementioned embodiments, and combinations of the retaining member 48 shown in FIGS. 13A and 15 and the input terminal 83 shown in FIGS. 19A and 19B, and combinations of the retaining member 48 shown in FIGS. 16A through 18, 21A through 23, and 28 through 30 and the input terminals 81 and 82 shown in FIGS. 11A through 12B can also be possible to achieve the same operation and effects as with the aforementioned embodiments.

In the aforementioned embodiments, description has been made on the construction where a hollow tubular connecting member 41 is provided on the outer end face of a case cap 6, input terminals 81, 82 and 83 are disposed inside the connecting member 41, and brushes 7 and 16 are electrically connected to the input terminals 81, 82 and 83 via other electrically conductive materials. This invention, however, can naturally be applied to miniature motors having a construction that an input terminal 8 is connected directly to a brush 7, as shown in FIG. 1. Although description has also been made on an example where the retaining member 48 is formed in a substantially U shape in the plane shape thereof, the retaining member 48 can be formed into an L shape or I shape without a leg 55b.

This invention having the aforementioned construction and operation can achieve the following effects.

(1) The positive temperature coefficient resistor can be elastically held by the input terminal and the retaining member, and when an external pulling force is exerted ont the positive temperature coefficient resistor, the extracting resistance can be increased because the lanced and raised lug or the lanced and raised projection acts to cut into the surface of the electrode of the positive temperature coefficient resistor.

(2) The pushing force imparted to the positive temperature coefficient resistor can be controlled over a wide range and properly by forming the retaining member with a thin sheet material having a thickness of 0.2 mm. This permits the positive temperature coefficient resistor to be held in a sound condition without damaging to the surface of the positive temperature coefficient resistor.

(3) The positive temperature coefficient resistor can be easily inserted between the input terminal and the retaining member since a slight gap is formed at the inserting location before the positive temperature coefficient resistor is inserted.

(4) Even when a miniature motor having no positive temperature coefficient resistor is mixed by mistake with those having positive temperature coefficient resistors, they can be easily inspected because acceptability can be judged merely by checking the electrical continuity between the input terminal and the retaining member.

What is claimed is:

1. A miniature motor comprising a case made of a metallic material, formed into a bottomed hollow tubular shape, and having a permanent magnet fixedly fitted to the inner circumferential surface thereof, a rotor comprising an armature facing said permanent magnet and a commutator, and a case cap fitted to an open end of said case, and having brushes making sliding contact with said commutator and a pair of input terminals electrically connected to said brushes one of directly and via other electrically conductive members said rotor being rotatably supported by bearings provided on the bottom of said case and said case cap, characterized in that lanced structure formed from the group of a lanced and raised lug, and lanced and raised projections, are provided near tips of legs of a retaining member made of an electrically conductive material; retaining parts are formed by bending the tips of said retaining member legs to the same side as said lanced structure; and the size of a gap between a projection provided on a surface of said input terminals and a surface of said lanced structure of said retaining member in free state is made smaller than the thickness of a positive temperature coefficient resistor so that said positive temperature coefficient resistor can be inserted into said gap, and when said positive temperature coefficient resistor is moved in extracting direction, said lanced structure cuts into the surface of electrodes of said positive temperature coefficient resistor; a tip of said retaining member leg is formed into a fork shape by dividing into at least two prongs, with a lanced structure provided on any one prong, and a retaining part is formed by bending another prong to the same side as said lanced structure.

2. A miniature motor as set forth in claim 1 wherein retaining parts are formed by bending parts of said retaining member closer to the tips thereof than said lanced structure provided near the tips of said retaining member legs so that tip edges of said retaining parts come in contact with said positive temperature coefficient resistor.

3. A miniature motor as set forth in claim 1 wherein pushing pieces are integrally provided in such a manner as to protrude in a direction opposite to legs having retaining parts and elastically push the surface of said positive temperature coefficient resistor.

4. A miniature motor as set forth in claim 3 wherein a projection is provided on the inside wall on the input terminal side of a hole provided on said case cap for housing said positive temperature coefficient resistor; said projection coming in contact with the surface of said positive temperature coefficient resistor on both sides, in the across-the-width direction of the input terminal, of the projection provided on the input terminal.

5. A miniature motor as set forth in claim 1 wherein input terminals are formed of an electrically conductive material into a substantially L-shaped cross-section, with the L-shaped bent ends thereof being used as stoppers, a lanced and raised lug is provided at the intermediate part of said input terminals, and a projection coming in contact with said positive temperature coefficient resistor is provided between said stopper of any one input terminal and said lanced and raised lug.

6. A miniature motor as set forth in claim 1 wherein said input terminals are formed of an electrically conductive material into a substantially rectangular shape, a stopper formed into a width larger than the width of an intermediate part thereof is provided near one end thereof, a lanced and raised lug is provided at the intermediate part thereof, and another lanced and raised lug coming in contact with said positive temperature coefficient resistor is provided near said stopper provided near any one input terminal.

* * * * *